United States Patent Office 2,969,601
Patented Jan. 31, 1961

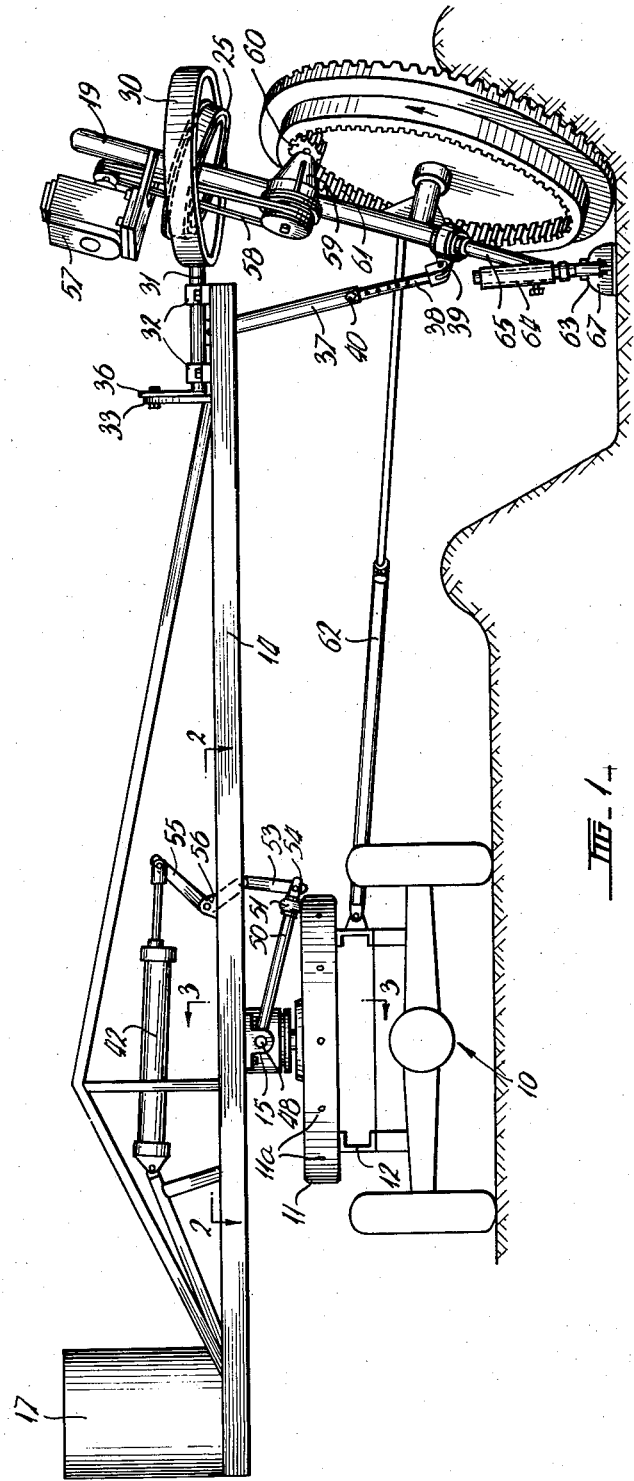

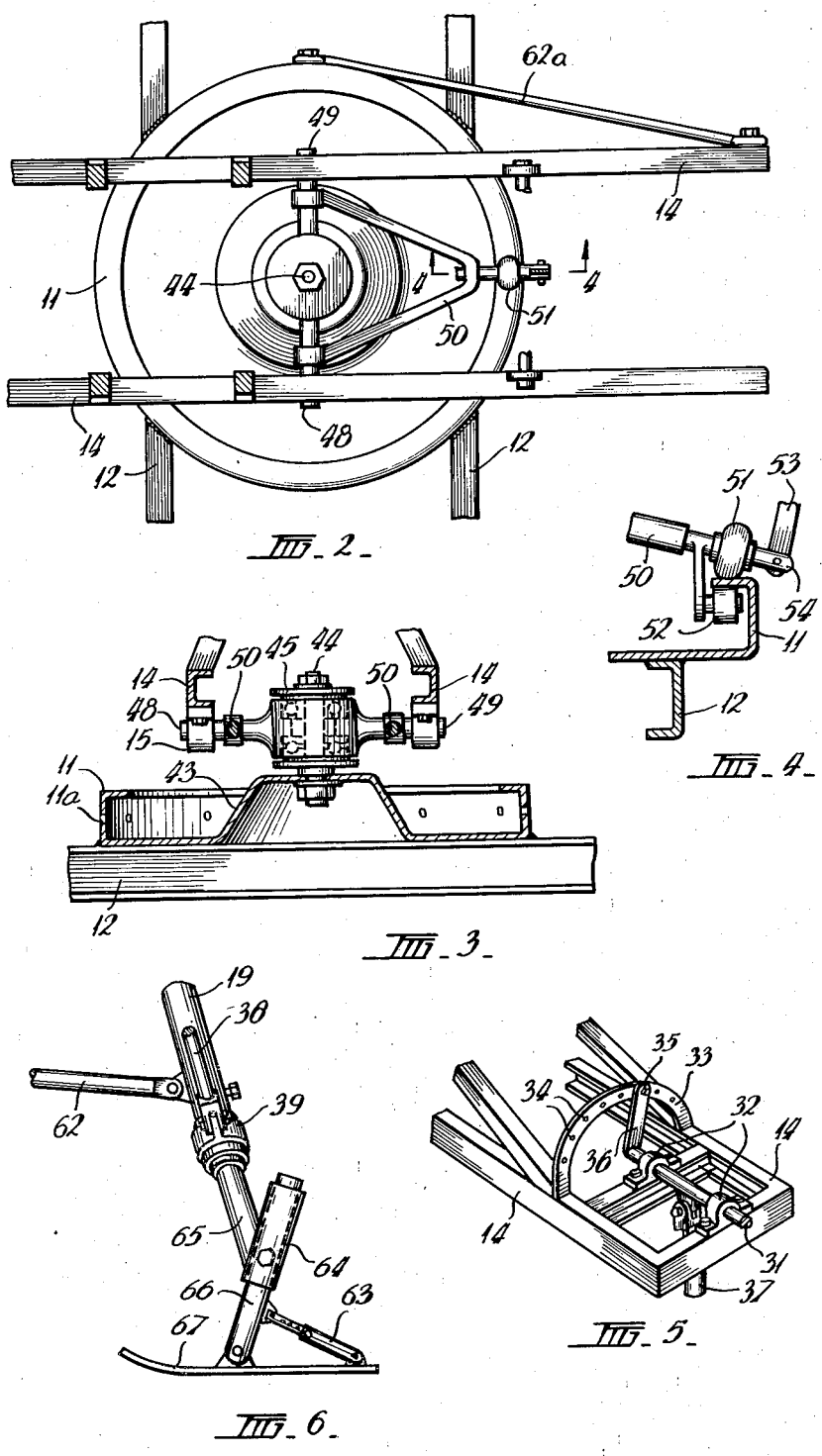

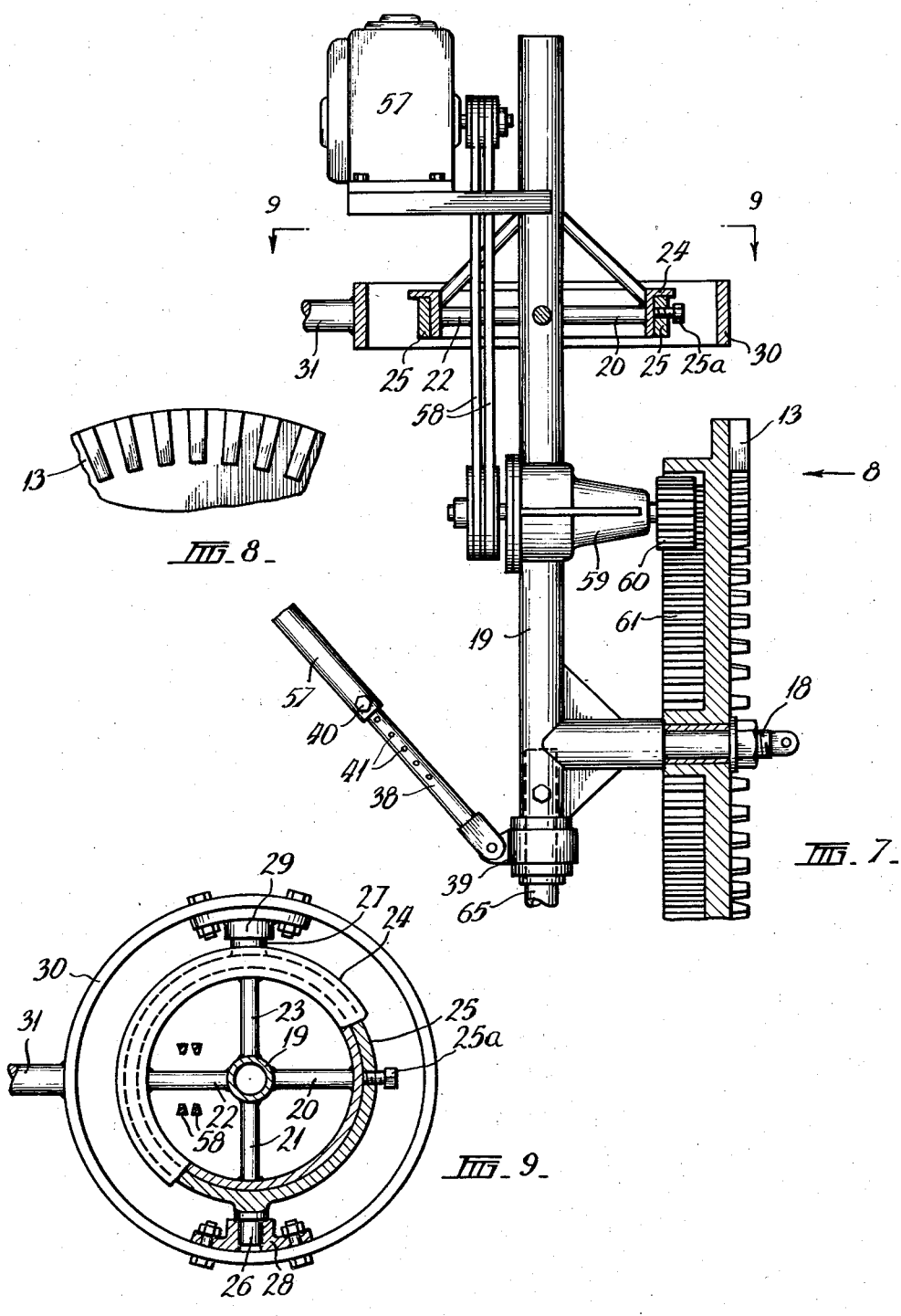

2,969,601

CHANNEL CLEARING MACHINE

James Herbert McMaster, 19 Richard St., Kyabram, Victoria, Australia

Filed Mar. 13, 1959, Ser. No. 799,212

4 Claims. (Cl. 37—94)

This invention relates to channel clearing machines and refers particularly to machines suitable for use in clearing irrigation channels and the like.

Up to the present time there has been no satisfactory machine available for the clearing of irrigation channels and accordingly these are usually kept clear by manual methods which are, of course, slow and costly.

The object of my invention is to provide a machine which can be used effectively to clear irrigation channels and the like and which can be operated at a satisfactory rate by a single operator.

According to this invention, a channel clearing machine comprises an adjustable power-driven wheel or rotary implement which, in use, is mounted in an off-set position on a vehicle and is adapted to be positioned in relation to a channel so that it will clear the channel as the vehicle is driven along one side of the channel, the wheel or rotary implement being carried at the end of a beam which is pivotally mounted on the vehicle so that the wheel or implement can be raised and lowered, the wheel or implement being mounted on the beam in such manner that its working angle may be adjusted in relation to the beam so that it may be inclined from a vertical plane whereby material removed from the channel will be deposited as a bank on one side of the channel. Preferably the wheel or implement can be swung from one side of the vehicle to the other so that the vehicle can be driven along either side of the channel while the latter is being cleared, and also allowing the vehicle to be driven in both directions along the same side of the channel.

In order that the invention may be clearly understood and readily put into practice, a preferred specific construction of a channel clearing machine in accordance with the present invention will now be described with reference to the accompanying drawings, in which:

Figure 1 is a rear elevation of the machine,

Figure 2 is a sectional plan taken on the line 2—2 in Figure 1,

Figure 3 is a cross-sectional elevation taken on the line 3—3 in Figure 1,

Figure 4 is a cross-sectional elevation taken on the line 4—4 in Figure 2,

Figure 5 is a perspective view on an enlarged scale of a portion of the machine shown in Figure 1, Figure 6 is a side elevation on an enlarged scale or another portion of the machine shown in Figure 1, Figure 7 is an end elevation partly in section, showing the rotary clearing implement of the machine and its mountings, Figure 8 is a side view of portion of the rotary clearing implement taken in the direction designated by the arrow 8 in Figure 7, and Figure 9 is a sectional plan view taken on the line 9—9 in Figure 7.

The machine illustrated in the drawings is carried upon a vehicle 10 having a four wheel drive, and is mounted upon a turntable 11 supported on the chassis 12 of the vehicle so that the clearing mechanism can be swung through an angle of at least 180° from one side of the vehicle to the other. The clearing implement itself comprises a wheel 13 carried at the end of a beam 14 in the form of a pair of channel sections pivotally mounted for movement in a vertical plane on the turntable. The wheel 13 is thus adjustable vertically and horizontally. In use, the beam 14 is disposed transversely of the vehicle so that the clearing wheel 13 is offset from the longitudinal centre line of the vehicle. The weight of the wheel and its mountings is counterbalanced by a weight 17 carried at the opposite end of the beam 14.

The clearing wheel 13 is mounted on a stub axle 18 which projects at right angles from the lower end of a hollow shaft 19 which extends in a generally upward direction. The shaft 19 near its upper end is secured to four spider arms 20, 21, 22, 23 which project radially outwards therefrom and are attached at their outer ends to a ring 24 which runs on an annular support 25. The working angle of the wheel can thus be adjusted by rotating the shaft 19 on the support 25 to the desired position relative to the direction of travel of the vehicle. The annular support 25 is carried on trunnion arms 26, 27 which project into bearing members 28, 29 bolted to an annular member 30 which in turn is rotatably supported by means of a shank 31 in bearings 32 at the end of the main beam 14 (see Figure 5). The shank 31 secured to the annular member 30 is carried in the bearings 32 so that rotation of the shank within the latter alters the plane of the annular member 30 and accordingly the angle of slope, in the front to rear direction, of the shaft 19 on which the clearing wheel 13 is carried.

The angle of slope of the shaft 19 can be adjusted in a transverse direction by swinging the annular support 25 into the requisite position on the trunnions 26, 27.

In Figure 5, adjusting means are shown for securing a desired setting of the annular member 30. These adjusting means comprise a semi-annular plate 33 having holes 34 therein to accommodate a movable pin 35. The inner end of the shank 31 is secured to an arm 36 having an opening which registers with the various holes 34 on rotation of the shank 31 and enables the shank to be secured in any desired position by passing the pin through the opening in the arm 36 and the appropriate hole in the plate.

To facilitate rotation of the shank 31 into the desired position, the arm 36 may be extended downwardly below the shank 31 and connected by means of a link to a crank handle which is rotatably connected to the link whereby rotation of the crank causes the arm 36 to swing. This construction is not shown in the drawings.

The securing means to angularly position the shaft 19 in a transverse direction consists of an upper tube 37 connected to the shank 31 and a lower tube 38 which slides telescopically within the upper tube. The latter is provided with a hole and the lower tube with a series of holes 41 whereby a removable pin 40 may be inserted through aligned holes in the tubes to secure the tubes together. The lower tube 38 is pivotally connected to a collar 39 mounted on the lower end of the shaft 19, while the upper tube 3 is pivotally attached to the main beam 14. As the upper end of the shaft 19 is supported by the fore and aft trunnions 27, 26 respectively it is obvious that the shaft may be swung in a direction transverse to the direction of movement of the vehicle and locked in any desired position by inserting the pin 40 through the hole in the upper tube 37 and the appropriate hole in the lower tube 38.

In addition to the above adjustments, the angle of the beam 14 relative to the horizontal can be adjusted by a hydraulic ram 42 mounted on the upper portion of the turntable 11 and engaging the beam 14 on the wheel side of the main pivot mounting in order to raise and lower the beam as required in use or during transport. The main pivot bearing is supported upon a hub 43 which is rigidly connected, by welding or otherwise, to the turntable 11 which is supported on the chassis 12 of the vehicle 10. The main pivot bearing comprises a vertical axle 44 which is rigidly attached to the hub 43 and fitted with a roller bearing 45 which can rotate around the axle. The bearing is provided with oppositely directed arms 48, 49 which engage with bearings 15, 16 carrying the main beam 14, the latter is thus enabled to swing in a vertical plane on the turntable 11.

A V-shaped bracket 50 is secured to the arms 48, 49 and is supported at its narrow end by a double roller element 51, 52 which engages above and below the upper horizontal flange of the turntable 11. A link 53 is pivotally connected to the supporting shaft 54 of the upper roller 51 and to the lower arm of a bell crank 55 which is itself pivotally mounted on the main beam 14. The upper arm of the bell crank 55 is pivotally connected to the piston rod of the ram 42.

The wheel 13 is driven by means of an engine 57 carried on a support rigidly secured to the upper end of the shaft 19 above the annular member 30. The engine 57 is connected by a V-belt drive 58 to a gear box 59 provided with a reversing gear through which is driven a pinion 60 meshing with driving segments 61 located on the rear or inner side of the wheel 13. The direction of rotation of the latter can thus be controlled as desired.

A draught rod 62, which is adjustable in length, is connected, when desired, between the chassis 12 and the lower portion of the shaft 19. If it is not convenient to utilise the draught rod 62 in the position referred to, a shorter rod 62a may be connected between the turntable 11 and the beam 14 as shown in Figure 2. A series of holes 11a are provided around the turntable to facilitate the connection of the rod 62a thereto in the desired position.

In use, the beam 14 is swung round into the desired position and set at the desired vertical angle by means of the hydraulic ram 42. To lower the operative end of the beam, the piston of the ram will be caused to move to the left as seen in Figure 1. This will cause the toggle linkage 53, 56 between the beam 14 and the turntable 11 to move further out of alignment so that the right hand end of the beam will be pulled down towards the turntable. Conversely, a movement of the ram piston to the right will cause the operative end of the beam to be raised in relation to the turntable. The shank 31 of the annular member 30 is then rotated within the bearings 32 at the end of the beam 14 in order to adjust the slope of the shaft 19 in the front to rear direction of the vehicle. The slope of the shaft 19 can be adjusted in a transverse direction by withdrawing the pin 40 from the telescopic shafts 37, 38 and rotating the support 25 on the trunnion arms 26, 27 to the desired angle before reinserting the pin 40. The working angle of the wheel can be adjusted by rotating the shaft 19 and the ring 24 on the annular support 25, the parts being locked by tightening set screw 25a. The gear box 59 is then set in order to provide the desired direction of rotation of the clearing wheel 13 having in mind the direction of travel of the wheel 13 along the channel.

To assist in maintaining an even depth cleared by the clearing wheel 13 even when the vehicle is travelling over rough or uneven ground, a skid plate 67 may be provided at the rear of the clearing wheel. The skid plate is pivotally attached to the lower end of a rod 66 which is adjustably housed within a sleeve 64, the latter being rigidly secured to, and at an angle to, the lower end of an insert 65 which itself fits adjustably within the lower end of the hollow shaft 19. The rear end of the skid plate is connected to the rod 66 below the sleeve 64 by means of an adjustable link 63, the adjustment of which determines the working angle of the skid plate. The adjustment of the insert 65 within the shaft 19 determines the setting of the clearing wheel in relation to the skid plate.

If desired, the skid plate could be replaced by a trailing wheel performing the same function.

Normally the clearing wheel 13 will be set so as to clear the far side of the channel when the vehicle is working in one direction along the channel.

At the end of the traverse, the beam 14 will be swung around so that the wheel 13 is located on the opposite side of the vehicle and the run will be made again in the reverse direction with the appropriate setting and direction of rotation of the wheel. In this way the other side of the channel will also be cleared, substantially half of the cleanings being deposited on each bank of the channel.

When the machine is not in use, the beam is swung around until it is disposed longitudinally of the vehicle and so that the wheel hangs over the rear end of the vehicle. In this way the width of the machine is reduced to that of the vehicle in order to facilitate the normal running of the vehicle and transport of the machine to and from the operational site. To hold the beam in the longitudinal position during transport of the machine, the shorter draught rod 62a is connected between the turntable and the beam, the connection between the rod and the turntable being effected at a lateral position on the latter.

I claim:

1. A channel clearing machine comprising a vehicle having a chassis, a turntable mounted on said chassis, a generally horizontal beam pivotally and rotatably mounted on said turntable and having one end extending beyond said vehicle, the beam thereby being capable of rotation about a vertical axis from one side of the vehicle to the other, a support member disposed at the said one end of the generally horizontal beam, a generally vertical beam rotatably mounted on said support member whereby said generally vertical beam may be rotated about its own axis, bearings journalling the said support member at the said one end of the generally horizontal beam permitting the generally vertical beam to be inclined at any desired angle in relation both to the vertical plane including the axis of the generally horizontal beam and the vertical plane perpendicular thereto, a disc-like rotary implement rotatably mounted at the lower end of the said generally vertical beam, the rotary implement having a periphery extending below the generally horizontal beam for engagement with the soil in a channel below the level of the ground surface on which the vehicle is supported, and power means supported on said generally vertical beam for rotating the rotary implement at any position thereof in relation to the said generally horizontal beam at such a speed that material removed from the channel by the rotary implement will be deposited as a bank on one side of the channel.

2. A channel clearing machine as claimed in claim 1, further comprising a weight which is arranged at the other end of the generally horizontal beam, whereby the weight of the rotary implement and its mounting is counter-balanced.

3. A channel clearing machine as claimed in claim 1, wherein the support member comprises a shank journalled in bearings at the said one end of the generally horizontal beam and extending outwardly therefrom in the direction of the beam, an outer ring secured to the outer end of said shank, an inner ring disposed within said outer ring and journalled in bearings on the inner side of said outer ring, a ring support mounted on, and rotatable concentrically with the said inner ring, and spider means connecting said ring support with the upper end of the generally vertical beam.

4. A channel clearing machine as claimed in claim 1, and further comprising a ground-engaging skid plate which is adjustably secured to the generally vertical beam at the rear of the rotary implement.

References Cited in the file of this patent

UNITED STATES PATENTS

| | | |
|---|---|---|
| 1,750,829 | Wilson | Mar. 18, 1930 |
| 2,558,623 | Mott | June 26, 1951 |
| 2,655,678 | Keogh | Oct. 20, 1953 |
| 2,685,751 | Bain | Aug. 10, 1954 |
| 2,885,800 | Hawkins | May 12, 1959 |

FOREIGN PATENTS

| | | |
|---|---|---|
| 1,037,942 | France | May 6, 1953 |
| 75,661 | Netherlands | Aug. 16, 1954 |
| 302,836 | Switzerland | Jan. 17, 1955 |
| 217,978 | Australia | Sept. 11, 1958 |